(12) United States Patent
Pauly et al.

(10) Patent No.: US 8,384,552 B2
(45) Date of Patent: Feb. 26, 2013

(54) RADIATION PORTAL WITH OCCUPANCY AND MOTION SENSING SYSTEM

(75) Inventors: Steven W. Pauly, Knoxville, TN (US); William Richardson, Knoxville, TN (US); Richard S. Seymour, Clinton, TN (US)

(73) Assignee: Nucsafe, Inc., Oak Ridge, TN (US)

( * ) Notice: Subject to any disclaimer, the term of this patent is extended or adjusted under 35 U.S.C. 154(b) by 280 days.

(21) Appl. No.: 12/796,340

(22) Filed: Jun. 8, 2010

(65) Prior Publication Data
US 2011/0298622 A1    Dec. 8, 2011

(51) Int. Cl.
*G08B 17/12* (2006.01)

(52) U.S. Cl. ............... 340/600; 340/540; 340/573.1; 340/522

(58) Field of Classification Search ............ 340/600, 340/540, 541, 573.1, 573.4, 522, 521; 250/336.1, 250/359.1, 390.07
See application file for complete search history.

(56) References Cited

U.S. PATENT DOCUMENTS

| | | | |
|---|---|---|---|
| 7,760,103 B2 * | 7/2010 | Frank | 340/600 |
| 2004/0000999 A1 * | 1/2004 | Turner et al. | 340/572.4 |
| 2006/0284094 A1 * | 12/2006 | Inbar | 250/359.1 |
| 2008/0191887 A1 * | 8/2008 | Mullikin et al. | 340/600 |
| 2009/0002492 A1 * | 1/2009 | Velipasalar et al. | 348/152 |
| 2009/0140853 A1 * | 6/2009 | Nielsen et al. | 340/540 |

* cited by examiner

*Primary Examiner* — Anh V La
(74) *Attorney, Agent, or Firm* — Luedeka Neely Group, P.C.

(57) ABSTRACT

Disclosed is a radiation monitoring system that has a radiation detector for making radiation measurements within a monitored area. An occupancy sensor may be provided for detecting a presence of an entity in the monitored area, and a motion sensor may be provided for detecting a motion of the entity in the monitored area. In a typical embodiment, a radiation measurement collection system is provided which has a first program logic element for collecting the radiation measurements as collected radiation measurements when the presence of the entity is detected and the motion of the entity is detected. Also provided is a method for monitoring an area for intermittent sources of radiation.

14 Claims, 2 Drawing Sheets

RADIATION PORTAL WITH OCCUPANCY AND MOTION SENSING SYSTEM

FIELD

This disclosure relates to the field of radiation monitoring portals and stations. More particularly, this disclosure relates to radiation portals and stations for monitoring radiation where vehicles, cargo, or persons may intermittently stop while passing through the portal or station.

BACKGROUND

Radiation detection portals and stations are used, for example, to monitor vehicles at international border crossings, to monitor shipments at seaports, and to monitor people, luggage, and cargo at airports in order to detect and prevent the movement of potentially dangerous radiation emitting devices and materials. These radiation detection portals typically use various combinations of radiation detectors to detect and identify gamma and neutron radiation. A specific problem with these measurements results often occurs when the vehicle or other object being measured for radiation does not pass through the portal in a continuous manner, but rather stops within the portal because of traffic or other reasons. Such intermittent motion may adversely affect the accurate interpretation of radiation measurements. What are needed therefore are improved systems and methods for interpreting radiation measurements from radiation monitoring portals through which vehicles, cargo, or persons pass, or for monitoring radiation where vehicles, cargo, or persons may intermittently stop while passing through the portal or station.

SUMMARY

The present disclosure provides a radiation monitoring system that has a radiation detector for making radiation measurements within a monitored area. An occupancy sensor is provided for detecting a presence of an entity in the monitored area, and a motion sensor is provided for detecting a motion of the entity in the monitored area. In a typical embodiment a radiation measurement collection system is provided and the radiation measurement system has a first program logic element for collecting the radiation measurements as collected radiation measurements when the presence of the entity is detected and the motion of the entity is detected. In a typical embodiment an alarm system is provided for activating an alarm signal if the collected radiation measurements exceed a threshold value.

Also provided is a method for monitoring an area for intermittent sources of radiation. Typically included is a step of detecting radiation as radiation measurements in the monitored area, and a step of detecting a presence of an entity in the monitored area, and a step of detecting a motion of the entity in the monitored area. A method embodiment typically also provides for collecting the radiation measurements as collected radiation measurements when the presence of the entity is detected and the motion of the entity is detected, and activating an alarm signal if the collected radiation measurements exceed a threshold value.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
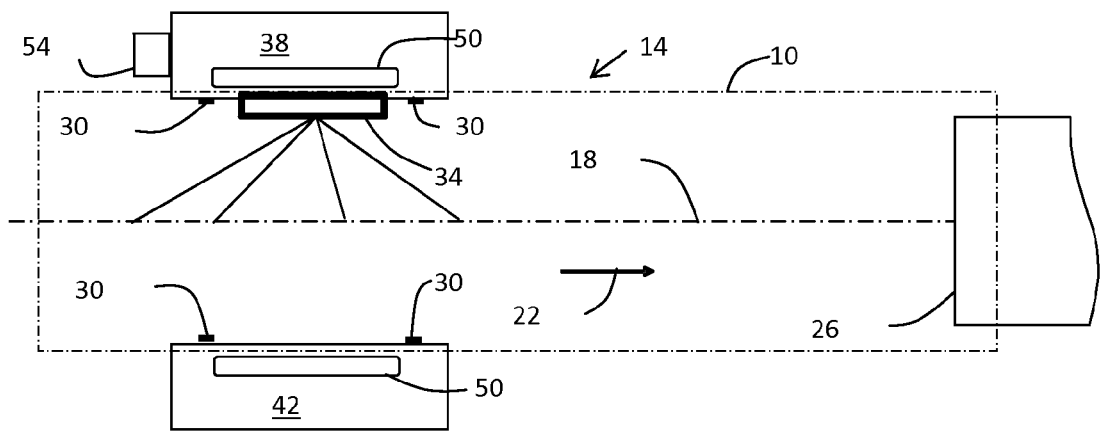
FIG. 1 is a somewhat schematic top view of a radiation monitoring portal.

In the following detailed description of the preferred and other embodiments, reference is made to the accompanying drawings, which form a part hereof, and within which are shown by way of illustration the practice of specific embodiments of a radiation monitoring system and embodiments of methods for detecting sources of radiation in a monitored area. It is to be understood that other embodiments may be utilized, and that structural changes may be made and processes may vary in other embodiments.

Radiation detection portals are finding increased use in borders, airports, and seaports by customs inspectors and other authorities to detect and prevent the movement of potentially dangerous radiation emitting devices and materials. "Portal" is a term that is typically used to refer to a radiation monitory system for inspecting vehicles or people. "Screening station" is a term that is typically used to refer to a radiation monitoring system for inspecting manufactured items, mail, packages, cargo, and luggage. The term "entity" is used herein to refer to anything that is subject to radiation monitoring, such as a vehicle, a package, a person, cargo, etc. These radiation monitoring systems may use various types and combinations of radiation detectors to detect and identify gamma and neutron radiation within a monitored area. In the case of a portal application the monitored area is typically a region along one or more lanes of vehicular traffic or human passage. In other applications the monitored area may be a zone through which entities pass for inspection. In the case of personnel monitoring stations the monitored area is often an archway through which people walk.

Several specific problems may occur in most existing radiation measurements systems when the entity being monitored for radiation does not pass through the radiation measurement system in a continuous manner, but rather stops within the monitored area because of traffic congestion or other reasons. A first problem that typically occurs is a degradation of measurement sensitivity because taking radiation measurement data while the entity is stopped results in an accumulation of radiation counts for a long time, and such measurements may essentially be only normal background radiation. For example, assume that a threat point source of radiation is located at the rear of a vehicle. If a 70 foot tractor trailer moving at 5 miles per hour enters and exits the portal without stopping, the total portal occupancy time is about 9.55 seconds. In such a situation each part of the vehicle is measured for the same amount of time and the acquisition of radiation measurements is uniform. However, suppose a vehicle containing a radiation source stops where the front of the tractor or container is within the portal and the radiation source is outside the portal. In a very bad case scenario where the vehicle is stopped for a very long time (say, up to 10 to 30 minutes) radiation measurements that represent substantially only background radiation are collected. Then when the rear portion of the vehicle moves through the portal, the radiation source is measured for a very short time compared to the total occupancy time during which background radiation measurements were collected. Consequently the signal to noise is significantly degraded. A second problem that occurs as the result of stopping during transit through a portal occurs with respect to identifying the location of a radiation source within an entity. In addition to detecting the presence of a radiation source within an entity, it is highly desirable to detect the location of such a source within the entity. In the scenario just-presented, information about the position of the source is degraded because the profile of the vehicle is distorted by the long residence time of the entity while it was stopped in the portal.

To overcome some of these problems and enhance the performance of radiation monitory systems, various algorithms may be employed to better account for the radiation background based upon the presence or absence of entities within the portal, and the motion (or lack thereof) of entities within the portal. For example, portals may use combinations of "occupancy sensors," which may be implemented using off-the-shelf devices such as magnetic proximity sensors, infrared beams, lasers, or active microwave sensors to detect the presence of objects within the portal. Motion sensing may use similar combinations of sensors with increasing sophistication to ensure motion is detected or may use motion sensors specifically designed to detect motion. The motion sensors may be passive infrared sensors, cameras with motion sensing software algorithms, or similar devices.

Regardless of how a presence of an entity (i.e., "occupancy") and motion of an entity are sensed, various embodiments described herein employ a time correlation between occupancy and motion to create a logical AND of occupancy and motion. The ANDed value is then used to gate off the collection of radiation measurement data unless both occupancy and motion are true. Logic state signals corresponding to on/off (true/false) are typically generated by program logic elements. In practice a plurality of "program logic elements" may physically reside within a single electronic processing device.

In typical embodiments, when both occupancy and motion are false, then background radiation data may be updated. If either one (but not both) is true, then the radiation measurement data are typically ignored and the background measurements and alarm threshold adjustments are latched (values held). When both occupancy and motion are true, then radiation measurement data are collected (and typically integrated) within the occupancy time window by a radiation collection measurement system. This process provides a collection of radiation measurements that emulate radiation measurements that would be collected from a continuous, uninterrupted passage of the entity through the monitored area.

One embodiment is depicted in FIG. 1. FIG. 1 portrays a top view of a monitored area 10, which is in this case being monitored by a portal 14. The portal 14 is an example of a radiation monitoring system. Vehicles or objects move through the portal 14 along the portal center line 18 in a direction of travel 22. The rear of a vehicle 26 that has just exited the portal 14 is depicted. Occupancy sensors 30 and motion sensors 34 provide logical outputs in a time correlated manner. The portal 14 employs a portal left side radiation detector panel 38 and a portal right side radiation detector panel 42. In some embodiments only one detector panel may be used. Each radiation detector panel (38 and 42) employs at least one radiation detector 50 for acquiring radiation measurements within a monitored area 10. The portal 14 also includes a radiation measurement collection system 54, which processes radiation measurements acquired by the radiation detectors 50 and employs program logic elements to process logic signals from the occupancy sensors 30 and the motion sensors 34.

Figure 2:
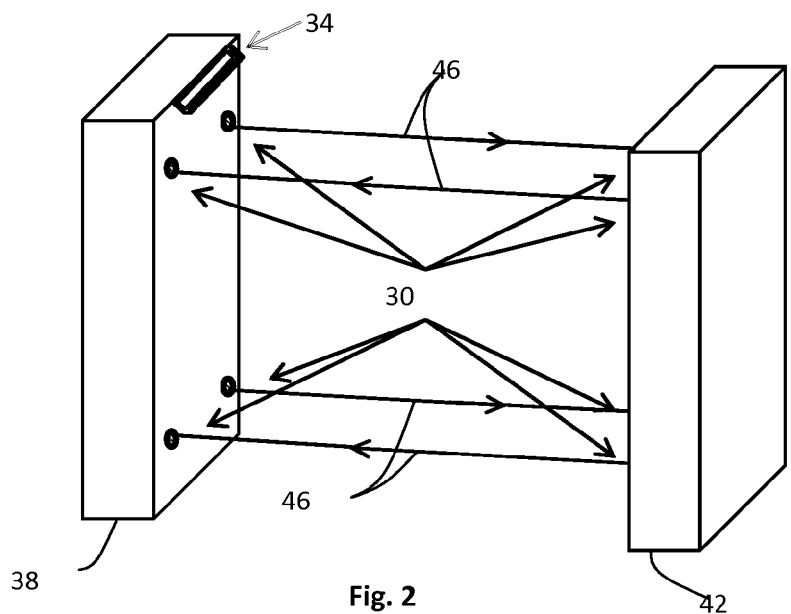
FIG. 2 is a somewhat schematic side perspective view of a portion of the radiation monitoring portal of FIG. 1.

FIG. 2 depicts a perspective view of a portion of the embodiment of FIG. 1, illustrating an exemplary position of the occupancy sensors 30. In the embodiment of FIG. 1 the occupancy sensors 30 are a break-beam type, such as infrared, ultrasonic, or laser sensors. In other embodiments such technologies as pressure sensors may be used as occupancy sensors 30. The occupancy sensors 30 shown in FIG. 2 are disposed adjacent the detector panels, but in other embodiments the occupancy sensors 30 may be disposed distal from the detector panels. Typically multiple occupancy sensors 30 are used to ensure that various different types of vehicles will be detected. However, in some embodiments a single occupancy sensor may be used. In the embodiment of FIG. 1 a plurality of occupancy sensing beams 46 are aligned orthogonally straight across from each other but in alternate embodiments the beams may be aligned at non-orthogonal angles and may be crossed. In some cases, pairs of the sensors may be used as a speed sensor to determine the entry and exit speed of the entity in the portal 14. In some embodiments a single motion sensor may be used. In some embodiments, as described in more detail later herein, an electronic camera may be adapted for use as a motion sensor.

Figure 3:
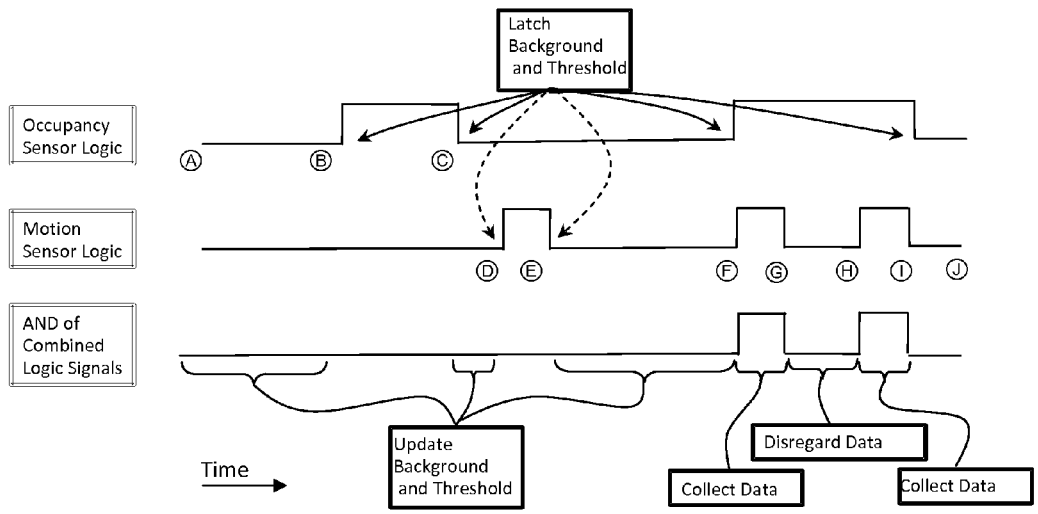
FIG. 3 is an annotated logic diagram depicting occupancy and motion logic gate states and the AND logic state of the two gate states.

FIG. 3 depicts the on/off (true/false) logic information from the occupancy and motion sensors (e.g., motion sensors 34 of FIGS. 1 and 2), and the logical AND combination. Time events A through J are depicted. When neither sensor is on, such as time intervals A-B, C-D, E-F, and I-J, the system may update background radiation readings. Background radiation occurs from radiation sources that typically occur naturally within and around a radiation monitory station. Radiation monitoring systems are typically looking for evidence of radiation levels that exceed a "normal" background level, which is established as a threshold value for generating an alarm signal. Background levels change over time, and instrument signal gains may drift, so it is prudent to employ the radiation measurement collection system 54 to periodically update the background radiation measurement. The radiation measurement collection system 54 typically employs a program logic element for collecting a portion of the radiation measurements as background radiation measurements at various times when only background radiation is likely present. The portal 14 then uses the new background radiation measurements to adjust the alarm threshold value. The process of adjusting the alarm threshold value typically employs an algorithm based on, for example, a cumulative radiation count, a radiation count rate, an energy-weighted radiation count effect, or a similar measurement.

When an entity is present in the monitored area 10, there is the potential that the entity may hold a radiation source which the Portal is expected to detect. In such circumstances, as the entity passes through the portal 14, the radiation detectors 50 will (expectedly) detect both background radiation and radiation emitted by the radiation source, and (expectedly) the amount of radiation measured will exceed the alarm threshold. The process of detecting this condition proceeds as follows: When the occupancy sensors 30 detect an object within the monitored area the occupancy sensors 30 provide a logic signal to the radiation measurement collection system 54. The logic signal may first be used by the radiation measurement collection system 54 to discard recent background radiation events and to latch (stop updating) both the background radiation detection system and the alarm threshold adjustment system typically for as long as the occupancy sensor system is on. Recent background events are typically discarded because they may be inaccurate due to effects of an approaching or departing vehicle. Consequently, depending on the time scale, the radiation measurements taken during interval C-D shown in FIG. 3 may be discarded in their entirety as potentially inaccurate "recent background events." Once the radiation measurement collection system 54 has evaluated recent background events for discard, a program logic element then triggers the collection of a portion of the radiation measurements as "collected radiation measurements." These "collected radiation measurements" include background radiation (which is always present) plus radiation (if any) that is emitted by a source held by the entity that is passing through the portal 14. If these collected radiation measurements exceed the threshold value, then an alarm signal is generated.

FIG. 3 illustrates these and further aspects of various embodiments. For example, if the motion sensors 34 are triggered and there is no occupancy signal (such as in interval D-E) from the occupancy sensors 30, the system may either be configured to latch (stop updating) background measurements and threshold adjustments or to ignore such a motion signal that is present when no occupancy signal is present. When both the occupancy and motion sensors detect the presence and movement of an object (respectively), such as in intervals F-G and H-I, the ANDed signals create a time correlated logic signal that indicates that an entity is within the portal 14 and is moving. In that logical state, radiation measurements are collected and measured (and typically integrated) as long as these occupancy and motion conditions are both true.

When the motion sensors 34 are off (e.g., false) and the occupancy sensors 30 are on (e.g., true), such as interval G-H, it is apparent that the object or vehicle is stopped within the monitored area. During such intervals the radiation measurements are disregarded. This logic pattern for selectively collecting and selectively disregarding radiation measurements results in a collection of measurements that represents a virtual continuous passage of the vehicle through the monitored area regardless of whether the vehicle stops one or more times while moving through the monitored area 10. The radiation measurements are insensitive to how long the vehicle is stopped in the portal 14. Final data are substantially equivalent to that of an object moving through the system continuously without stopping. Both radiation sensitivity and source position information are preserved.

While various break-beam sensors may be used to detect occupancy and motion of a vehicle, person, or object in a radiation monitoring system, there are ruggedized electronic cameras that are available commercially and that may be adapted for these purposes. These cameras are sophisticated in that processing capabilities are embedded within the camera and they can be accessed as TCP/IP Ethernet devices. The degree of sophistication is often such that regions of images may be defined by the user, and algorithms are often included within the camera software for detecting motion and detecting changes in the picture. These motion/change algorithms may be used for detecting motion and/or occupancy of a radiation detection portal such as the portal 14. Furthermore, many radiation monitoring applications require that a picture be captured showing the license plate or serial number of the vehicle when a radiation event is detected and databases of the radiation event must be stored during the event. Consequently, in principle, a single electronic camera may be used to detect occupancy, to detect motion, and to capture needed images. However, applications of such cameras typically require that the camera has a direct line of sight through the center of the portal 14. This often creates a problem because a camera cannot be positioned in a manner that would obstruct the portal lane and disrupt traffic flow.

One way to circumvent this problem is to install the camera in a position to obtain a field of view of the exit of the portal 14. Typically, a camera is installed in that orientation anyway to collect identification information regarding vehicles or persons or items passing through the portal 14. Such a camera may be adapted for use as an occupancy sensor and a motion detector. In such embodiments the camera is an example of where the occupancy sensor and the motion sensor are integrated in a single sensor.

For use as a motion detector a camera that includes on-board software may be programmed to define a region (typically a rectangular area) within the field of view of an image. The software includes an algorithm that detects time-wise changes in the pixels within the defined region. Typically, the algorithm performs a matrix correlation of the pixels of a stored motion reference image with the pixels in a subsequent newer image or in several subsequent newer images. If the change(s) exceed(s) a user-defined threshold the camera generates a signal indicating that motion has occurred. Typically the motion reference image is updated periodically at some constant time interval (generally every few seconds) so that once an object has stopped moving a new motion reference image will eventually be defined such that subsequent newer images would match the new motion reference image, indicating that motion has ceased.

Several methods may be used with a camera to indicate occupancy, typically using either the defined rectangle that is used to indicate motion or using a different defined region. A first method is to use the output of the motion detection algorithm. Once a first motion is detected the portal is considered to be occupied until a second motion is detected. While this is a simple method it typically assumes that the portal is initially unoccupied, which may not be true. Also, this first method assumes that the object will stop within the portal after the first motion is detected so that a second motion detection event indicates the object has left the portal, which also may not be true. That is, the object may never stop at all or the object may stop/start after the first motion which would confuse the occupancy decision. However, this first method may be adequate in some applications.

A second method for indicating occupancy is to define an occupancy reference image and then compare this occupancy reference image using a pixel-by-pixel correlation to subsequent newer images. The occupancy reference image is updated at some constant time interval (typically on the order of a few seconds). As soon as a new image (or several images) no longer correlate with the occupancy reference image, the occupancy reference image is latched (held constant). That is, the occupancy reference is temporarily not updated at the constant time interval. Starting at that point and continuing during such time as the occupancy reference image does not correlate with newer images (by exceeding some correlation threshold), the portal is considered to be occupied. This process accommodates motion of the object (i.e., it signals that the portal as occupied both while motion occurs as well as when an object becomes motionless within the portal), since the subsequent images likely do not correlate to the occupancy reference image that was taken and held prior to the occupancy. Once the new images again correlate to the latched reference image, the occupancy indication ends indicating the portal is no longer occupied and the reference image is again updated slowly at some constant time interval. One drawback to this method is if the portal becomes occupied for a very long time, it may be possible that the lighting changes in the image due to weather changes or diurnal ambient light cycles and the latched reference image may never be able to correlate to a new image once the object exits the portal. This would make it difficult to detect that the occupancy has ended. Various enhancements may be used to overcome this potential problem with a camera occupancy system. For example, it may be useful to adjust the occupancy indication from a camera using a supplementary method if the camera-indicated occupancy exceeds some maximum expected duration. It may also be useful to adjust the threshold for correlation in cases where long occupancy durations are expected. It may also be useful to force an occupancy reference image update after some timeout period which is much longer than the typically expected occupancy time.

Figure 4:
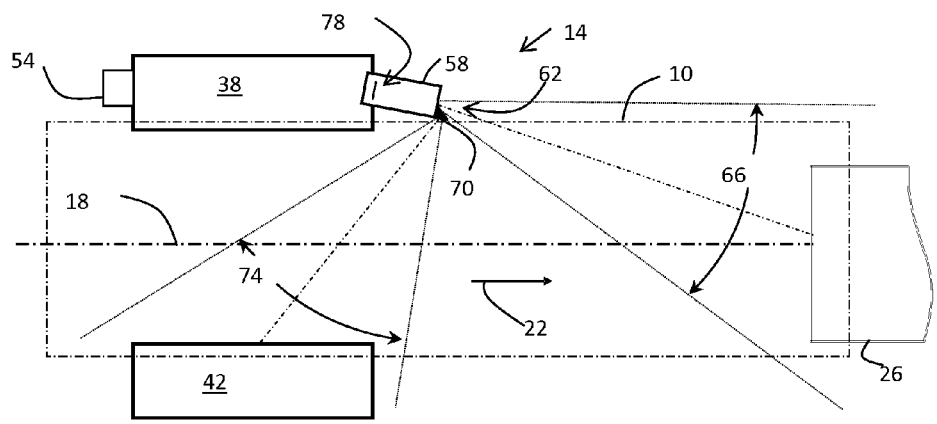
FIG. 4 is a somewhat schematic top view of a radiation monitoring portal equipped with an electronic camera.

FIG. 4 illustrates an embodiment where the occupancy sensor and the motion sensor are integrated in a single sensor, a camera 58. The camera 58 has a first optical system 62 that includes a lens for imaging a first field of view 66 where a vehicle identification picture may be captured. A prism or mirror may be disposed adjacent the lens. The prism or mirror represents a second optical system 70 for imaging a second field of view 74 that is different from the first field of view 66. Typically the first field of view 66 encompasses an area within or adjacent to the monitored area 10, where an image of entity (e.g., the rear of the vehicle 26) that has passed through or will pass through, or is passing through the radiation monitoring station (e.g., the portal 14) may be acquired. Typically the second field of view 74 encompasses a portion of the monitored area 10 where entities move within the portal 14. Preferably the first optical system 62 and the second optical system 70 are configured such that only a small corner (or other small portion) of the first optical system 62 (e.g., the camera lens) is occluded by the second optical system 70 (e.g., the prism or mirror). The camera 58 includes an image sensor 78 for creating an electronic image. Preferably only a small portion of the image sensor 78 sees the second field of view 74 while most of the image sensor 78 sees the first field of view. In one preferred embodiment the second optical system 70 comprises a prism that is affixed to the front of the camera lens or housing window. The prism may be a standard right triangle 90 degree silvered prism or may have other prism face angles (such as 120 degrees). Generally it is possible to orient such prisms to obtain virtually any desired second field of view of the portal 14. Motion/change detection software within the camera 58 allows the region of the image sensor 78 that sees the second field of view 74 to be defined and monitored for change or motion. Furthermore, the software causes an electronic message to be sent to the radiation measurement collection system 54 when such change or motion is detected in that specific region of the image sensor 78.

This adaptation of such a camera 58 provides occupancy and/or motion detection while still providing vehicle identification information. In some embodiments, multiple prisms may be used to allow one camera (e.g., 58) to monitor more than one lane of traffic. Multiple regions may be defined and viewed within the portal 14 via the prism to provide vehicle profiles and/or to exclude classes of vehicles or cargo from being monitored. Multiple regions may also be used to provide a plurality of image regions that may employ different occupancy and/or detection algorithms for use with different classes of vehicles or cargo.

In summary, embodiments disclosed herein provide arrays of simple sensors that may be deployed within radiation detection portals to detect motion and occupancy of the portal by vehicles, cargo, or people passing through the portal. These sensors may be used to detect motion and this information can be ANDed with the occupancy data to provide a measurement that is a virtual equivalent of the vehicle or object moving through the portal continuously. In some embodiments an electronic camera may be adapted to provide occupancy sensing and motion sensing.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A radiation monitoring system comprising:
   (a) a radiation detector for making radiation measurements within a monitored area;
   (b) an occupancy sensor for detecting a presence of an entity within the monitored area;
   (c) a motion sensor for detecting a motion of the entity within the monitored area;
   (d) a radiation measurement collection system comprising a first program logic element for collecting a first portion of the radiation measurements as collected radiation measurements when: (i) the presence of the entity is detected and (i) the motion of the entity is detected; and
   (e) an alarm system for activating an alarm signal if the collected radiation measurements exceed an alarm threshold value.

2. The radiation monitoring system of claim 1 wherein the radiation measurement collection system comprises a second program logic element for collecting a second portion of the radiation measurements as background radiation measurements when the presence of the entity is not detected.

3. The radiation monitoring system of claim 1 wherein the radiation measurement collection system comprises a second program logic element for collecting a second portion of the radiation measurements as background radiation measurements when: (i) the presence of the entity is not detected and (ii) the motion of the entity is not detected.

4. The radiation monitoring system of claim 1 wherein the first program logic element is for:
   (i) collecting the first portion of the radiation measurements as collected radiation measurements when ((i)-i) the presence of the entity is detected and ((i)-ii) the motion of the entity is detected, and for
   (ii) disregarding the radiation measurements when: (ii)-i the presence of the entity is not detected and ((ii)-ii) the motion of the entity is not detected.

5. The radiation monitoring system of claim 1 wherein when the presence of the entity is not detected the radiation measurement collection system comprises a second program logic element for collecting the radiation measurements as background radiation measurements and for adjusting the alarm threshold value.

6. The radiation monitoring system of claim 1 wherein the radiation measurement collection system comprises a second program logic element for collecting the radiation measurements as background radiation measurements and for adjusting the alarm threshold value when: (i) the presence of the entity is not detected and (ii) the motion of the entity is not detected.

7. The radiation monitoring system of claim 1 wherein the motion sensor comprises a video camera comprising:
  (a) a first optical system for imaging a first field of view,
  (b) a second optical system for imaging a second field of view that is different from the first field of view, and
  (c) image processing software for detecting motion of an object in the second field of view.

8. The radiation monitoring system of claim 1 wherein the occupancy sensor and the motion sensor are integrated in a camera.

9. A processor-based method for detecting a source of radiation in a monitored area comprising:
  (a) detecting radiation measurements within the monitored area;
  (b) detecting a presence of an entity within the monitored area;
  (c) in a step separate from step (b), detecting a motion of the entity within the monitored area;
  (d) collecting a first portion of the radiation measurements as collected radiation measurements when: (i) the presence of the entity is detected and (ii) the motion of the entity is detected; and
  (e) activating an alarm signal if the collected radiation measurements exceed a threshold value.

10. The method of claim 9 further comprising:
  (f) collecting a second portion of the radiation measurements as background radiation measurements when the presence of the entity is not detected.

11. The method of claim 9 further comprising:
  (f) Collecting a second portion of the radiation measurements as background radiation measurements when: (i) the presence of the entity is not detected and (ii) the motion of the entity is not detected.

12. The method of claim 9 wherein step (d) comprises:
  i. collecting the first portion of the radiation measurements as collected radiation measurements when: ((i)-i) the presence of the entity is detected and ((i)-ii) the motion of the entity is detected, and
  ii. disregarding the radiation measurements when: ((ii)-i) the presence of the entity is not detected and ((ii)-ii) the motion of the entity is not detected.

13. The method of claim 9 further comprising:
  (f) collecting the radiation measurements as background radiation measurements and adjusting the alarm threshold when the presence of the entity is not detected.

14. The method of claim 9 further comprising:
  (f) collecting the radiation measurements as background radiation measurements and adjusting the alarm threshold when: (i) the presence of the entity is not detected and (ii) the motion of the entity is not detected.

* * * * *